J. H. KETCHESON & R. W. GOEB.
APPARATUS FOR IMPREGNATING POROUS ARTICLES.
APPLICATION FILED JUNE 19, 1908.
970,509.
Patented Sept. 20, 1910.
4 SHEETS—SHEET 1.
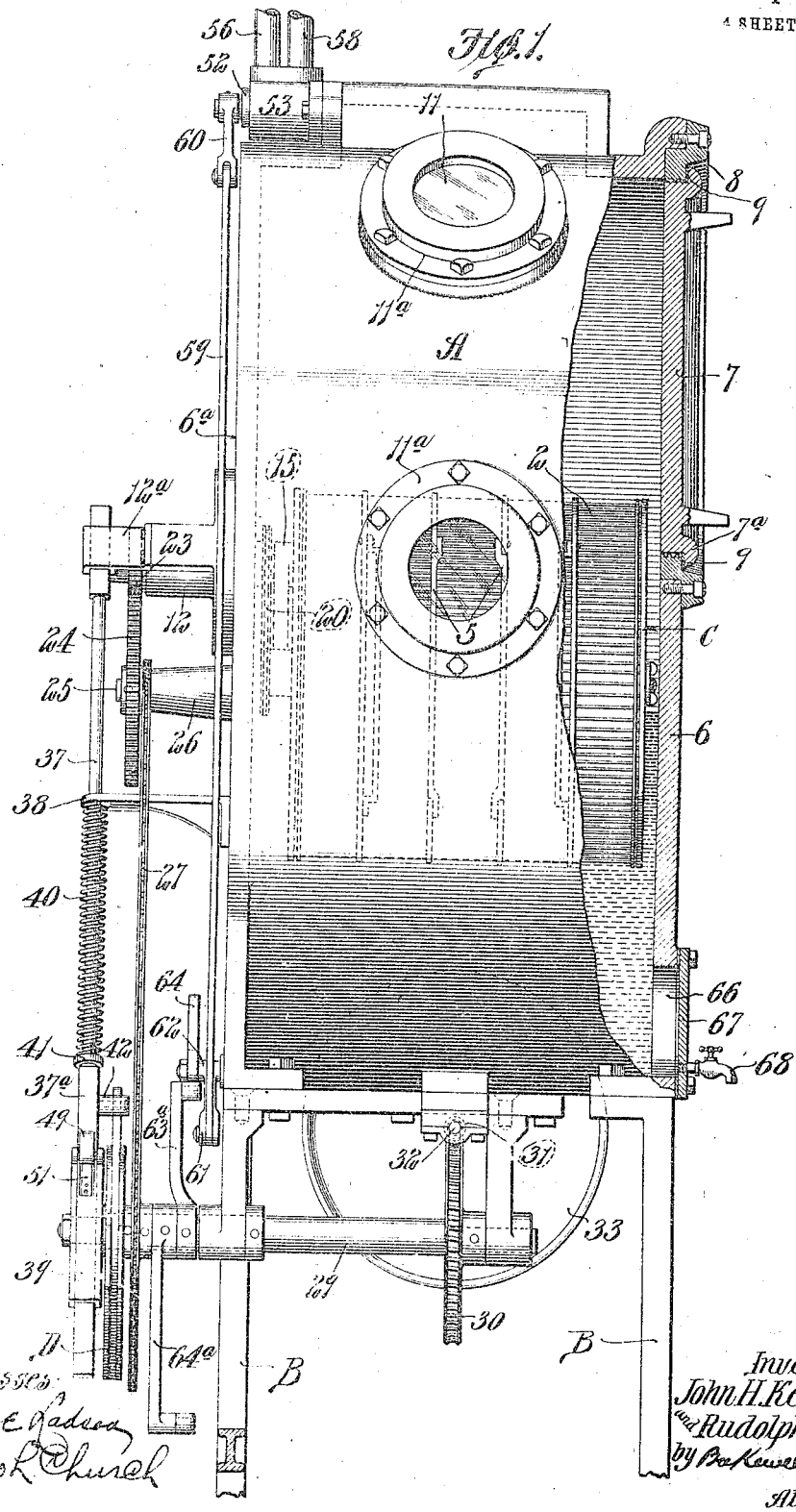
Witnesses:
George E. Hadson
Nells R. Church
Inventors:
John H. Ketcheson
and Rudolph W. Goeb
by Bakewell Cornwall
Attys.

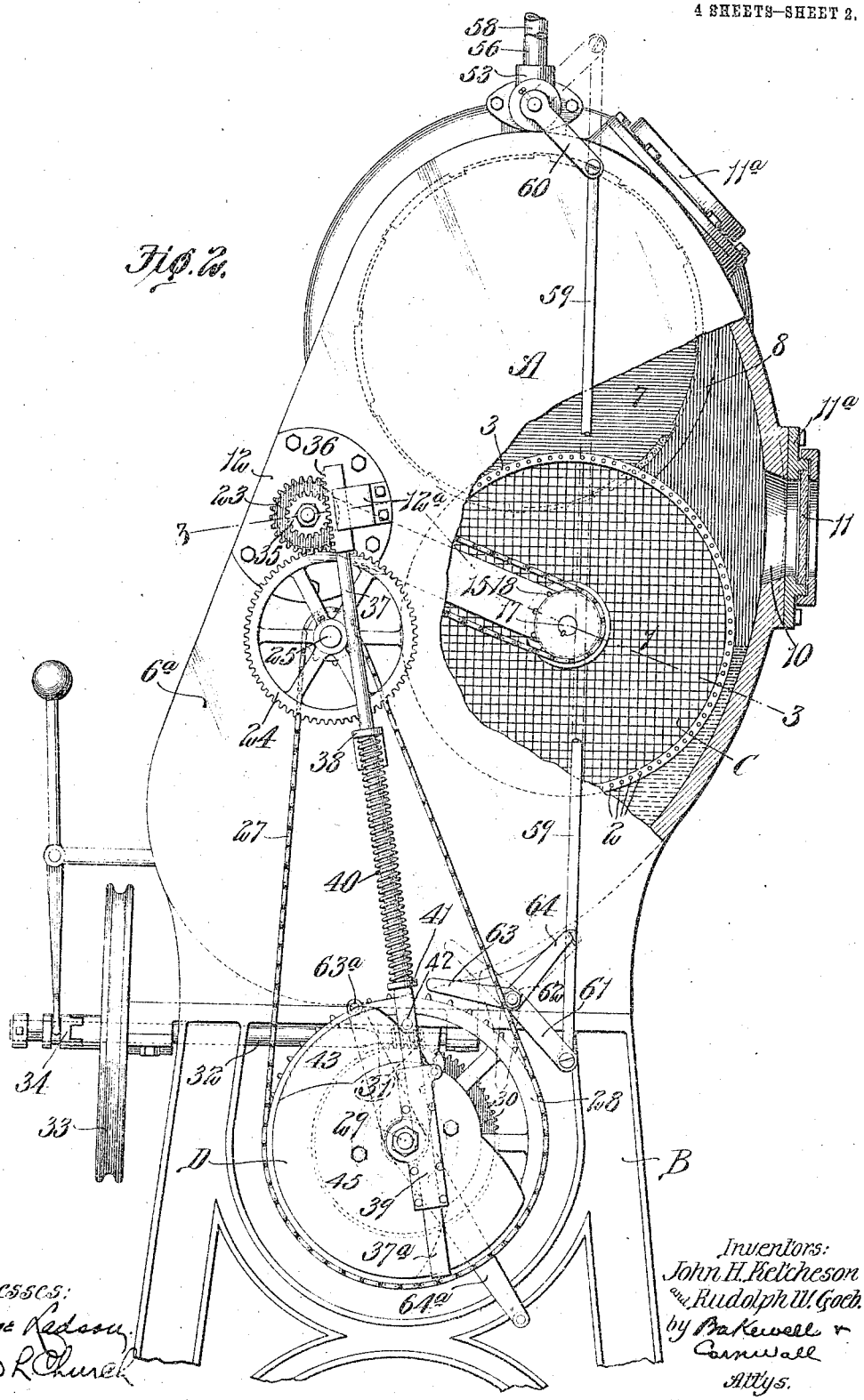

J. H. KETCHESON & R. W. GOEB.
APPARATUS FOR IMPREGNATING POROUS ARTICLES.
APPLICATION FILED JUNE 19, 1908.
970,509.
Patented Sept. 20, 1910.
4 SHEETS—SHEET 3.
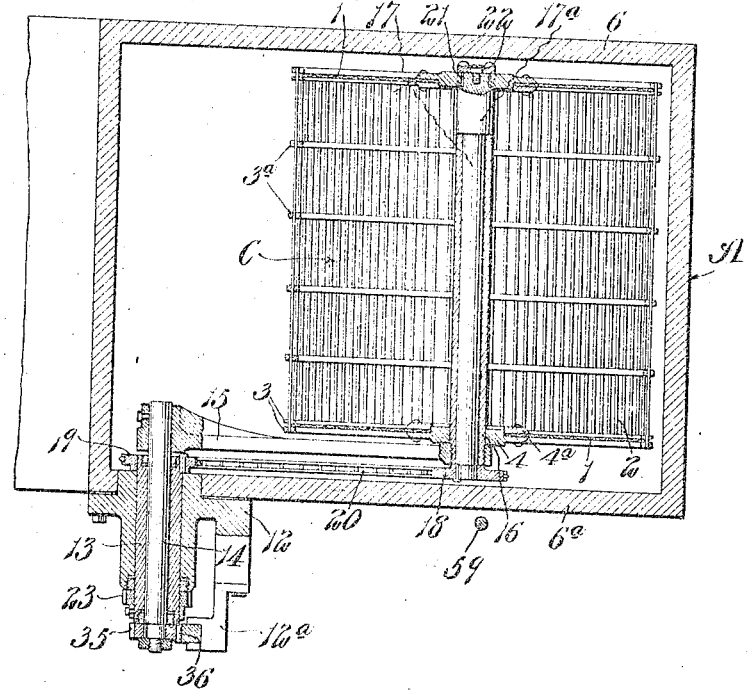
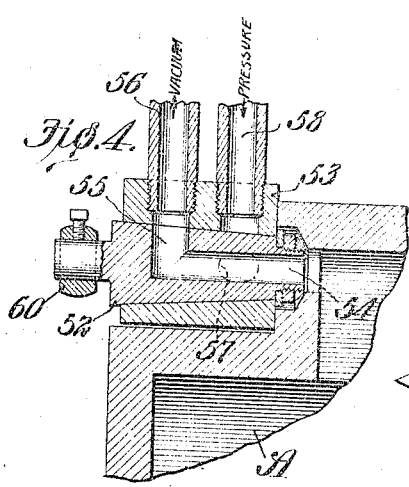
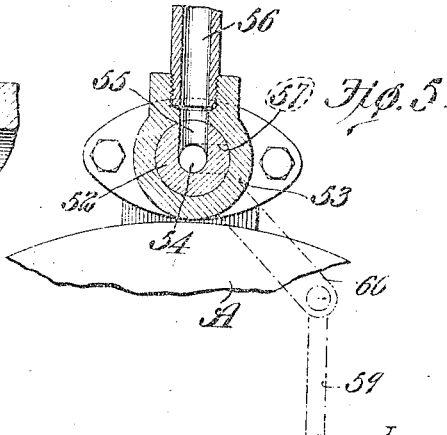
Witnesses:
George Ladson
Wells R. Church
Inventors:
John H. Ketcheson and
Rudolph W. Goeb.
By Kenyon Cornwall Attys.

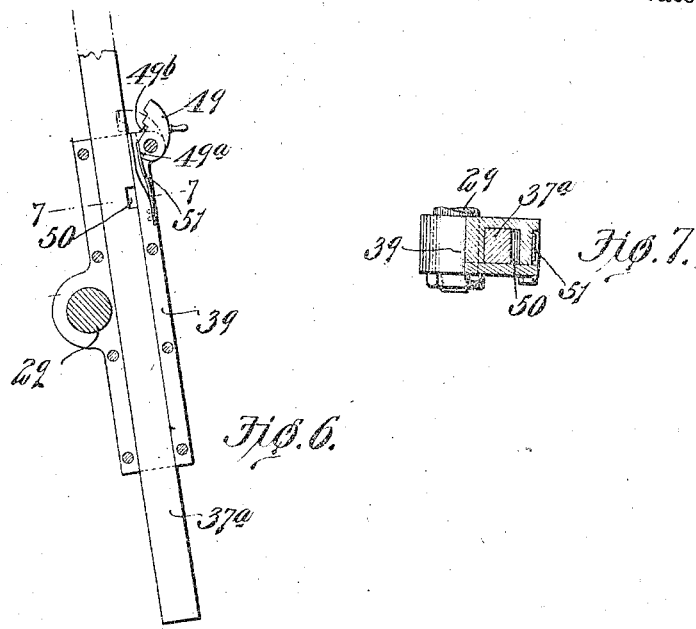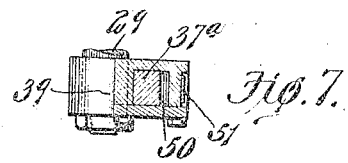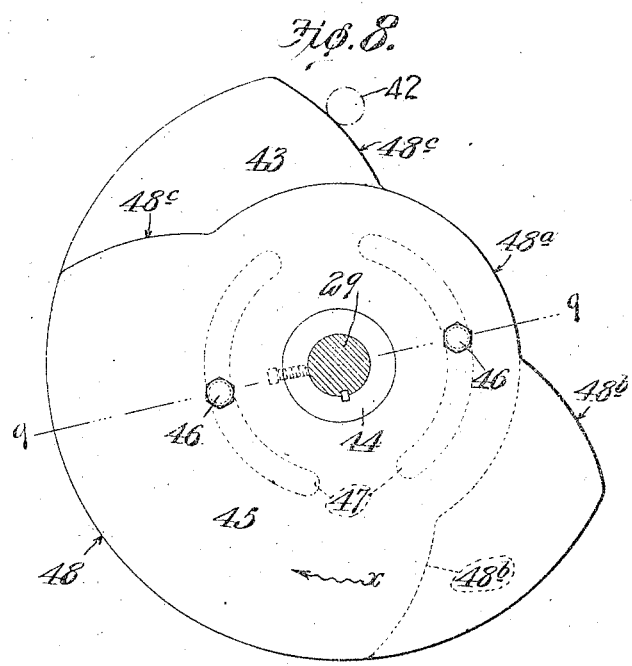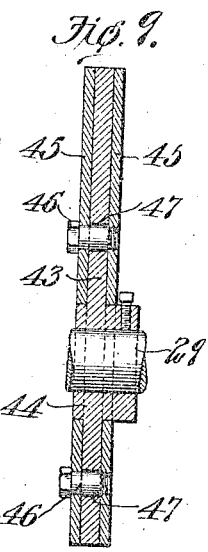

UNITED STATES PATENT OFFICE.

JOHN H. KETCHESON AND RUDOLPH W. GOEB, OF ST. LOUIS, MISSOURI, ASSIGNORS TO UNITED STATES FIBRE STOPPER COMPANY, OF ST. LOUIS, MISSOURI, A CORPORATION OF SOUTH DAKOTA.

APPARATUS FOR IMPREGNATING POROUS ARTICLES.

970,509.

Specification of Letters Patent. Patented Sept. 20, 1910.

Application filed June 19, 1908. Serial No. 439,434.

*To all whom it may concern:*

Be it known that we, JOHN H. KETCHESON and RUDOLPH W. GOEB, both citizens of the United States, residing at St. Louis, Missouri, have invented a certain new and useful Improvement in Apparatus for Impregnating Porous Articles, of which the following is a full, clear, and exact description, such as will enable others skilled in the art to which it appertains to make and use the same, reference being had to the accompanying drawings, forming part of this specification, in which—

Figure 1 is a front elevation of an apparatus constructed in accordance with our invention, a portion of the tank being broken away to more clearly illustrate certain features of same; Fig. 2 is an end elevation of said apparatus and also shows the tank broken away to more clearly illustrate certain features of the apparatus; Fig. 3 is a horizontal cross sectional view taken on approximately the line 3—3 of Fig. 2; Fig. 4 is a detail sectional view of the valve that governs the vacuum in the tank and also the air pressure; Fig. 5 is a detail sectional view of said valve taken at approximately right angles to Fig. 4; Fig. 6 is a detail view of the pivotally mounted guide which receives the bar that actuates the rock arm on which the receptacle is mounted; Fig. 7 is a sectional view taken on approximately the line 7—7 of Fig. 6; Fig. 8 is an enlarged side elevational view of the cam that moves said bar in one direction; and Fig. 9 is a sectional view taken on the line 9—9 of Fig. 8.

This invention relates to apparatus that are used for treating or finishing articles formed from pulp fiber and other cellulose substances.

The main object of our invention is to provide an apparatus having means for subjecting a porous or cellulose article to a vacuum, dipping it into a solution containing a filling substance, and thereafter subjecting the article to a blast of air to force the filling substance which collects on the surface of the article into the pores of same.

The apparatus herein shown is adapted to be used for treating bottle stoppers formed from pulp fiber or other cellulose material, but it will, of course, be obvious that it could be used for treating numerous other articles.

The solution used in treating the articles preferably consists of india rubber and a solvent such, for example, as carbon bisulfid, that soaks into the articles and thus leaves a coating of rubber on the surface of each article, and the object of subjecting the article to a vacuum is to open up its pores and withdraw the air therefrom so that the solution can penetrate into the article. The article is subjected to a vacuum prior to the time it is immersed, while it is immersed, and also for a short period after it has been drawn out of the solution so that the solvent which has penetrated into the pores of the article will be partially vaporized and withdrawn from the article, thus leaving the pores open so that the rubber can penetrate into the article when the air pressure is turned on.

While we have herein stated that the articles are treated in a solution consisting of india rubber and a solvent, it will, of course, be understood that it is immaterial so far as our present invention is concerned what kind of a solution is used for the machine herein described can be used for treating articles in any kind of a solution that contains a substance which is adapted to fill up the pores of the article.

Referring to the drawings which illustrate the preferred form of our invention, A designates a closed tank or casing that is mounted on a supporting frame or base B, said tank being adapted to be partially filled with a solution containing a filler; namely, a substance that is used for filling the pores of a porous or fibrous article.

The articles to be treated are placed in a carrier or receptacle C that is arranged inside of the tank A and means are provided for intermittently moving the receptacle into and out of the solution in the tank so as to saturate the articles which the receptacle contains. The receptacle C is preferably of cylindrical-shape and of skeleton construction, and said receptacle is rotated or oscillated so as to agitate the mass of articles and thus cause each article to be completely coated with the solution. The receptacle herein shown is provided with disk-shaped ends formed by pieces of woven wire and the body portion of the receptacle is formed by a number of rods 2 that are spaced away from each other so as to produce a skeleton-like structure. Each of the pieces 1 of woven wire that form the ends of the receptacle has its outer edge clamped between a pair of rings 3 and its inner edge secured to a hub member 4 by a clamping ring $4^a$, as shown clearly in Fig. 3, the hub member in each end of the receptacle being provided with an opening for receiving the device that supports the receptacle. The rods 2 which form the body portion of the receptacle pass through the rings 3 on the ends of the receptacle and also through a number of intermediate rings $3^a$ so that a strong and rigid structure is produced.

While we have herein shown a receptacle that is composed of rods and pieces of woven wire it will, of course, be understood that the particular construction of said receptacle is immaterial so far as our broad idea is concerned as said receptacle could be formed in numerous ways without departing from the spirit of our invention.

To enable the articles to be placed inside of the receptacle C we have provided the body portion thereof with a door that is formed by hinged sections 5 of the intermediate rings $3^a$, as shown in Fig. 1, said hinged sections carrying rods that aline with the rigid rods 2 of the receptacle when the door is closed.

The end 6 of the tank A is provided with an opening that enables the receptacle C to be placed inside of the tank and removed therefrom and said opening is closed by a cover 7 which is so constructed that an airtight joint is produced between the peripheral edge of the cover and the opening that it closes. In the construction herein shown, the cover 7 is provided with a mutilated screw-thread, as shown in dotted lines in Fig. 2, that coöperates with a mutilated screw-thread on a ring 8 fastened to the end wall 6 of the tank, as shown clearly in Fig. 1, the cover being provided with a flange $7^a$ that clamps a gasket 9, or piece of packing, against the outer face of the ring 8 so as to produce an air and gas-tight joint. The object of providing the cover 7 with a mutilated screw-thread instead of a continuous screw-thread is to enable it to be placed in position and removed quickly for it is only necessary to give the cover a slight turn to lock it or disengage it from the ring 8. While we have herein shown a ring 8 provided with threads that coöperate with the threads on the cover, it will, of course, be obvious that the threads which lock the cover could be formed on the end wall 6 of the tank instead of on a separate piece 8, the only object in using a separate piece 8 being that it is cheaper to build the tank in this manner.

We prefer to provide the tank with one or more openings 10 that are covered by pieces of glass 11 so that the operator can see the articles while they are being treated, said pieces of glass being mounted in frames $11^a$ which are so constructed that gas or air cannot enter the tank or emerge therefrom through the openings 10.

A bearing 12 that is fastened to the outside face of the end wall $6^a$ of the tank has a sleeve 13 journaled therein, as shown in Fig. 3, and a short rock shaft 14 that is journaled in said sleeve is provided at its inner end with an arm 15 that is arranged inside of the tank A, said arm carrying the receptacle C, as hereinafter described. A long sleeve 16, which is rigidly connected to the inner end of the arm 15, forms a bearing for a rotatable shaft 17 provided at one end with a head $17^a$ that butts against the end of the sleeve 16 and at its other end with a sprocket wheel 18, as shown in Fig. 3, said sprocket wheel being keyed to said shaft and arranged between the arm 15 and the inside face of the end wall $6^a$ of the tank. A sprocket wheel 19 is keyed to the inner end of the sleeve 13 that is journaled in the bearing 12 on the end wall of the tank, and a sprocket chain 20 passes over said sprocket wheel and over the sprocket wheel 18 on the shaft 17 so as to impart a continuous rotary movement to the said shaft. The receptacle C is rotatably mounted on the long sleeve 16 which is connected to the arm 15 and said receptacle is keyed to the shaft 17 so that it will rotate therewith and thus agitate the mass of articles arranged inside of same.

The means herein shown for keying the receptacle to the shaft 17 consists of lugs 21 on one of the hub members 4 of the receptacle that fit in slots or grooves formed in the head $17^a$ of the shaft 17, as shown in Fig. 3, the receptacle being prevented from moving longitudinally of said shaft and the sleeve 16 by means of a button 22 or similar device on the end of the head $17^a$ that is adapted to be turned into alinement with the lugs 21 on the hub member of the receptacle.

A pinion 23 that is keyed to the outer end of the sleeve 13 meshes with a gear 24 secured to a shaft 25 that is journaled in a bearing 26 on the end wall $6^a$ of the tank, said shaft being provided with a small sprocket wheel that receives a sprocket chain 27 which passes over a large sprocket wheel 28 on a positively driven shaft 29. The shaft 29 is journaled in bearings on the supporting frame or base B which carries the tank, and said shaft 29 is provided with a worm gear 30 that meshes with a worm 31 on the main drive shaft 32 of the machine. The main shaft 32 is driven by a belt, not shown, which passes over a pulley 33, and a clutch 34 is provided for connecting and disconnecting said shaft and pulley.

The mechanism just described imparts a continuous rotary movement to the receptacle C in which the articles are mounted, and an oscillating movement is imparted to the arm 15 which carries said receptacle by means of the following mechanism: The shaft 14 to which the arm 15 is connected is provided at its outer end with a pinion 35 that meshes with rack teeth 36 on the upper end of a rod or bar 37 which is reciprocatingly mounted in stationary guides 12$^a$ and 38 on the end wall 6$^a$ of the tank and also a guide 39 that is pivotally mounted on the shaft 29. A coiled spring 40 which surrounds said rod and is interposed between the guide 38 and a collar 41 on said rod, moves the rod lowwardly and thus depresses the arm 15 so as to immerse the receptacle C in the solution in the tank. Said rod is moved upwardly so as to rock the arm 15 and receptacle upwardly out of the solution by means of a cam D that coöperates with a roll 42 on the rod 37, said cam being connected to the shaft 29, as shown clearly in Figs. 1 and 2. The cam D thus constitutes a means that govern the time the articles are immersed in the solution for when the roll 42 is traveling on the low point of the cam the receptacle will occupy its lowest position and when the roll 42 is traveling on the high point of the cam the receptacle will occupy its elevated position.

In order that the period which the articles remain in the solution may be varied, we have constructed the cam D so that it can be adjusted to vary the time of operation of the rock arm 15. The construction of the cam D is shown clearly in Figs. 2, 8 and 9, and referring to said figures, it will be seen that said cam comprises a central portion 43 having a hub 44 that is connected to the shaft 29 and two plates 45 arranged on opposite sides of the central portion 43, said plates being connected to each other and also clamped to the central portion 43 by bolts 46 which pass through curved slots 47 in said central portion 43. The central portion 43 and the two plates 45 are of the same shape and size and each has a concentric surface 48 that constitutes the high point of the cam, a concentric surface 48$^a$ which constitutes the low point of the cam, and two inclined or slightly curved surfaces 48$^b$ and 48$^c$ that form continuations of the surface 48$^a$.

When the plates 45 are adjusted in the position shown in Fig. 8 the surfaces 48$^b$ and 48$^c$ of said plates will be out of alinement with the corresponding surfaces on the central portion 43, the low point of the cam being formed by portions of the surfaces 48$^a$ of said three members and the continuations of said low point surface being formed by the surfaces 48$^b$ of the plates 45 and the surface 48$^c$ of the central portion 43. To increase the area of the low point surface of the cam the plates 45 are rotated in the direction indicated by the arrow X in Fig. 8 so as to move the surfaces 48$^b$ of said plates farther away from the surface 48$^c$ of the central member 43. To decrease the area of the low point surface of the cam the plates 45 are rotated in the opposite direction to bring the surfaces 48$^b$ of said plates closer to the surface 48$^c$ of the central portion 43, it being understood, of course, that the fastening devices or bolts 46 have to be loosened to enable the plates 45 to be moved. With a cam of this construction we are able to vary the length of time that the receptacle C remains in its lowered position 43, it being understood, of course, that different positions so that we can control accurately the dipping of the articles.

The rod or bar 37 is provided at its lower end with a non-circular portion 37$^a$ that passes through the pivotally mounted guide 39, and a dog 49 on said guide is adapted to engage a notch 50 on the bar 37 so as to lock said bar in such a position that the receptacle C is held out of the solution in the tank. As shown in Fig. 6, the dog 49 is provided with two flat faces 49$^a$ and 49$^b$, and the guide is provided with a flat spring 51 that is adapted to bear against either one of said faces to hold the dog in a certain position. When the spring 51 bears against the face 49$^a$ of the dog the dog will be held in an inoperative position, as shown in Fig. 6, so that the rod 37 can reciprocate and thus elevate and depress the receptacle C. When it is desired to hold the receptacle in an elevated position without stopping the machine the dog 49 is turned so that the spring 51 will bear upon the face 49$^b$ of the dog, the end of the dog engaging the notch 50 in the rod 37 and thus locking it.

As previously stated, the apparatus herein shown is provided with means for subjecting the articles in the receptacle C to a vacuum for a certain period and then to a blast of air under pressure, the vacuum operating to open up the pores of the articles and extract the air therefrom and also convert a portion of the solvent in the solution into a vapor or gas and the air pressure operating to force the rubber or filler which collects on the surfaces of the articles into the pores of same. The means herein shown for controlling the vacuum and air pressure consists of an oscillating valve 52 arranged in a valve casing 53 on the tank A, as shown clearly in Figs. 4 and 5. Said valve is provided with a bore or duct 54 having a branch 55 that alines with a vacuum pipe 56 when the valve is in one position and a branch 57 that alines with an air pressure pipe 58 when the valve is in a different position, the vacuum pipe 56 being connected to any suitable pump or suction device, not shown, and the air pressure pipe 58 being connected to a tank, not shown, which contains a supply of air under pressure. When the branch 55 of the duct 54 is in alinement with the vacuum pipe 56 the air pressure pipe 58 of course will be closed and when the branch 57 is in alinement with the air pressure pipe 58 the vacuum pipe 56 will be closed. The valve 52 is oscillated intermittently in opposite directions so as to create a vacuum in the tank A for a certain period and then introduce compressed air into the tank for a certain period by means of the following mechanism: A rod 59 which is connected to an arm 60 on the valve 52 has its lower end secured to a rock arm 61 on a stud or shaft 62 which is connected to the end wall 6ª of the tank, said rock arm being connected to a pair of arms 63 and 64 that are adapted to be engaged and moved by a pair of arms 63ª and 64ª on the constantly rotating shaft 29. When the arms 63 and 64 are in the position shown in full lines in Fig. 2 the branch 55 of valve 52 will be in alinement with the vacuum pipe 56 and a vacuum will be created in the tank A. When the arm 64ª on the shaft 29 engages the arm 64, said arm 64 will be moved into the position shown in dotted lines in Fig. 2, and the arm 61 will be rocked in a direction to move the rod 59 upwardly, thereby turning the valve 52 to cut off the vacuum pipe 56 and bring the branch 57 of said valve into alinement with the air pressure pipe 58 so as to admit a blast of compressed air into the tank. The arm 63 will now be in the position shown in dotted lines in Fig. 2 and when the arm 63ª on the shaft 29 engages said arm 63 the arm 61 will be rocked in the opposite direction and the rod 59 will move downwardly so as to turn the valve and thus cut off the air pressure pipe and open the vacuum pipe, these operations being repeated at each cycle of operations of the machine.

As shown in Fig. 1, the end wall 6 of the tank is provided with a clean-out hole 66 that is covered by a plate 67 which carries a faucet 68 for draining off the solution in the tank.

Having described the construction of the apparatus, we will now briefly describe the operation of same.

The articles to be treated are placed in the receptacle C and said receptacle is then introduced into the tank A through the opening in the end wall 6 thereof, the receptacle being slipped onto the sleeve 16 and connected to the shaft 17, as previously described. After the cover 7 has been placed in position the clutch 34 is thrown to connect the drive shaft to the pulley 33 and thus impart movement to the mechanism which actuates the valve 52 and the mechanism which presses and elevates the receptacle and also rotates the shaft to which the receptacle is connected. The valve-operating mechanism and the mechanism that actuates the receptacle, are so timed that a vacuum will be created in the tank for a short period before the articles are immersed in the solution, this vacuum being continued during the time the articles are immersed and also for a short period after they have been drawn out of the solution. The receptacle C remains in its elevated position during the time the roll 42 on the rod 37 is traveling on the high point of the cam D and during most of this time the articles are being subjected to positive air pressure so as to force the filler into the pores of same. The articles are dipped into the solution once and also subjected to a vacuum and a blast of air at each cycle of operations of the machine, and the length of time that the articles are kept in the tank depends upon the use for which they are intended and also on the size of the articles and the material from which the articles are formed.

Having thus described our invention, what we claim as new and desire to secure by Letters Patent is:—

1. In an apparatus of the class described a fixed air tight container adapted to hold a filling solution, means whereby a partial vacuum is established within the container, a rotating cage arranged for independent operation within the container, and means whereby said cage is raised and lowered in order to dip said cage and its contents into the filler.

2. In an apparatus of the class described, a fixed air tight container adapted to hold a filling solution, means whereby a partial vacuum is established within the container, means whereby fluid under pressure is delivered to the container, a rotating cage arranged for independent operation within the container and means whereby said cage is lowered and raised whereby said cage is dipped into the filling solution.

3. In an apparatus of the class described, a fixed air tight container adapted to hold a filling solution, means for alternately establishing a partial vacuum within the container and delivering fluid under pressure within the container, an independently operating cage arranged for rotation within the container, and means whereby said cage is lowered and raised for dipping said cage into the filling solution.

4. In an apparatus of the class described, a closed container adapted to hold a filling solution, a rotating cage arranged for operation within the container, a shaft journaled in one of the walls of said container, a swinging arm fixed on the inner end of said shaft for supporting said cage and means on the exterior of the container for imparting rotary motion to the cage and actuating said swinging arm.

5. In an apparatus of the class described, a closed container adapted to hold a filling solution, a shaft journaled in one of the walls of the container, a cage fixed on said shaft and arranged for operation within the container and adapted to receive and hold the articles to be impregnated, and means on the exterior of the container whereby said cage is simultaneously rotated and moved vertically.

6. In an apparatus of the class described, a rigid air tight container adapted to hold a filling solution, a cage arranged for independent operation within the container and adapted to receive and hold the articles to be impregnated, means whereby said cage is simultaneously rotated and swung vertically within the container and means whereby the articles while in the cage are alternately and intermittently subjected to a vacuum and to fluid under pressure.

7. In an apparatus of the class described, a rigidly fixed air tight container adapted to hold a filling solution, a cage arranged for independent operation within the container and adapted to receive and hold the articles to be impregnated, means whereby said cage is simultaneously rotated and swung vertically within the container and means whereby a partial vacuum is established in the container.

8. In an apparatus of the class described, a rigidly fixed air tight container adapted to hold a filling solution, a cage arranged for independent operation within the container and adapted to receive and hold the articles to be impregnated, means whereby said cage is simultaneously rotated and swung vertically within the retainer and means wehereby fluid pressure is delivered to the interior of the container.

9. In a machine of the class described, a container adapted to hold a filling solution, a rotating cage arranged for operation within the container, a swinging arm carrying the rotating cage, a shaft journaled in the walls of the container, on which shaft the swinging arm is fixed, means on the exterior of the container for actuating the shaft to swing the free end of the arm vertically, and means whereby the cage carried by the arm is continuously rotated.

10. In a machine of the class described, a container adapted to hold a filling solution, a rotating cage arranged for operation within the container, a swinging arm carrying the rotating cage, means on the exterior of the container for actuating the arm to swing the free end thereof vertically, means whereby the cage carried by the arm is continuously rotated and means whereby a partial vacuum is established within the container.

11. In a machine of the class described, a container adapted to hold a filling solution, a rotating cage arranged for operation within the container, a swinging arm carrying the rotating cage, means on the exterior of the container for actuating the arm to swing the free end thereof vertically, means whereby the cage carried by the arm is continuously rotated, means whereby a partial vacuum is established within the container and means whereby fluid under pressure is delivered to the container.

12. An apparatus of the character described, provided with a tank for holding a solution, a rock arm arranged inside of said tank, a receptacle carried by said rock arm for holding a number of articles, means for rocking said arm to force the receptacle into and out of the solution to coat the articles therein, and means for intermittently introducing blasts of air into the tank; substantially as described.

13. An apparatus of the character described, provided with a tank for holding a solution, a rock arm arranged inside of said tank, a receptacle carried by said rock arm for holding a number of articles, means for rocking said arm to force the receptacle into and out of the solution to coat the articles therein, means for intermittently introducing blasts of air into the tank, means for rotating the receptacle, and means for intermittently creating a vacuum in the tank prior to the introduction of the air; substantially as described.

14. An apparatus of the character described, provided with means for subjecting an article to a vacuum to open up the pores of same, means for immersing the article in a solution and then withdrawing it from the solution means whereby the immersing means is rotated to agitate the article, means for varying the period that the articles remain immersed in the solution, and means for subjecting the articles to fluid pressure after they have been withdrawn from the solution to force the coating on the surface of the articles into the pores of same; substantially as described.

15. An apparatus of the character described, provided with a tank for holding a solution, a rotary receptacle arranged inside of said tank for carrying a number of articles, means for creating a vacuum in the tank, means for moving said receptacle into the solution and thereafter withdrawing it from the solution to coat the articles, means for varying the time that the receptacle remains in the solution, and means for introducing a compressed fluid into the tank to act on the articles in said receptacle and thus force the coating into the pores of the articles; substantially as described.

16. An apparatus of the character described, provided with a tank for holding a solution, a rock arm arranged inside of said tank, a receptacle carried by said rock arm and adapted to hold a number of articles, a rack bar coöperating with a pinion that is connected to said rock arm, and means for moving said rack bar to actuate said rock arm; substantially as described.

17. An apparatus of the character described, provided with a tank for holding a solution, a rock arm arranged inside of said tank, a receptacle carried by said rock arm and adapted to hold a number of articles, a rack bar coöperating with a pinion that is connected to said rock arm, yielding means for moving the rack bar in one direction, and means for positively moving the rack bar in the opposite direction; substantially as described.

18. An apparatus of the character described, provided with a tank for holding a solution, a rock arm arranged inside of said tank, a receptacle carried by said rock arm and adapted to hold a number of articles, a rack bar coöperating with a pinion that is connected to said rock arm, yielding means for moving the rack bar in one direction, means for positively moving the rack bar in the opposite direction, and means for locking the rack bar in such a position that it cannot be operated on by the means that moves it positively in one direction; substantially as described.

19. An apparatus of the character described, provided with a tank, a rock arm arranged inside of said tank and provided with a sleeve, a rotatable shaft journaled in said sleeve, a receptacle that is adapted to be slipped over said sleeve, and means for connecting said receptacle to said shaft; substantially as described.

20. An apparatus of the character described, provided with a tank, a rock arm arranged inside of said tank and provided with a sleeve, a rotatable shaft journaled in said sleeve, a receptacle that is adapted to be slipped over said sleeve, means for connecting said receptacle to said shaft, means for rotating said shaft, and means for rocking said arm; substantially as described.

21. An apparatus of the character described, provided with a tank, a sleeve journaled in a bearing on one of the walls of said tank, a rock shaft journaled in said sleeve and provided with an arm that is arranged inside of said tank, a rotatable shaft carried by said arm and having a receptacle connected thereto, a sprocket chain passing over sprocket wheels connected to said shaft and said sleeve, means for rotating said sleeve, and a reciprocating rack bar meshing with a pinion that is connected to said rock shaft; substantially as described.

22. An apparatus of the character described, provided with a tank, a rock shaft provided with an arm that is arranged inside of said tank, a receptacle carried by said arm, a rack bar meshing with the pinion that is connected to said rock shaft, a rotating cam for moving said rack bar in one direction, and a spring interposed between a collar on said rack bar and a stationary guide through which the rack bar extends for moving the rack bar in the opposite direction; substantially as described.

23. An apparatus of the character described, provided with a tank, a rock shaft provided with an arm that is arranged inside of said tank, a receptacle carried by said arm, a rack bar meshing with a pinion that is connected to said rock shaft, a rotating cam for moving said rack bar in one direction, a spring interposed between a collar on said rack bar and a stationary guide through which the rack bar extends for moving the rack bar in the opposite direction, and means for locking said rack bar in such a position that it cannot be operated on by said cam; substantially as described.

24. An apparatus of the character described, provided with a closed tank, a rock arm arranged therein and carrying a receptacle, a reciprocating member for actuating said rock arm, and a cam having adjustable portions for actuating said reciprocating member; substantially as described.

25. An apparatus of the character described, comprising a tank for holding a solution, a vacuum pipe and an air or gas pressure pipe communicating with said tank, a single valve for controlling the circulation of air or gases in said pipes, a receptacle arranged inside of said tank for holding articles, means for moving said receptacle downwardly into the solution to immerse the articles and thereafter moving it out of the solution, and automatic means for intermittently moving the valve into one position to open the vacuum pipe and close the air pressure pipe and thereafter into a different position to close the vacuum pipe and open the air pressure pipe; substantially as described.

26. An apparatus of the character described, provided with a tank for holding a solution, a receptacle arranged inside of said tank, means for actuating said receptacle to dip the articles therein into and out of a solution, a vacuum pipe and an air pressure pipe communicating with said tank, a valve for controlling the circulation of air or gases in said pipes, a rock arm provided with a pair of arms, a connection between said rock arm and the valve, and rotatable means adapted to engage said arms and move the rock arm intermittently in opposite directions to change the position of said valve; substantially as described.

27. An apparatus of the character described, provided with a tank for holding a solution, a plate of glass covering an opening in said tank, a removable air-tight covering mounted in one of the walls of said tank, a rock arm arranged inside of said tank and provided with a supporting device, a removable article-holding receptacle that is adapted to be mounted on said supporting device, means for actuating said rock arm to dip the receptacle into and out of the solution in the tank, and means for intermittently creating a vacuum in the tank and introducing blasts of air into the tank; substantially as described.

28. An apparatus of the character described, provided with a rock arm, a receptacle carried by said rock arm and adapted to hold a number of articles, a member for actuating said receptacle, and a cam for operating said member, said cam consisting of a plurality of parts that are adjustably connected together so that the surface of the cam can be varied; substantially as described.

In testimony whereof, we hereunto affix our signatures, in the presence of two witnesses, this first day of June, 1908.

JOHN H. KETCHESON.
RUDOLPH W. GOEB.

Witnesses:
WELLS L. CHURCH,
GEORGE BAKEWELL.